United States Patent
Roschelle et al.

(10) Patent No.: US 8,656,044 B2
(45) Date of Patent: Feb. 18, 2014

(54) INVITATION FOR TRANSFERRING OBJECTS IN A COMMUNICATIONS NETWORK

(75) Inventors: Jeremy Roschelle, Palo Alto, CA (US); John Brecht, San Francisco, CA (US); Mark D Fry, Dallas, TX (US); Lana Moore, Plano, TX (US); Sandhya Karachiwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 405 days.

(21) Appl. No.: 12/464,418

(22) Filed: May 12, 2009

(65) Prior Publication Data

US 2009/0215020 A1 Aug. 27, 2009

Related U.S. Application Data

(63) Continuation of application No. 11/095,284, filed on Mar. 30, 2005, now abandoned.

(51) Int. Cl.
*G06F 15/16* (2006.01)

(52) U.S. Cl.
USPC .............................. 709/232; 709/238; 709/223

(58) Field of Classification Search
USPC .................. 709/232, 212, 213, 238, 245, 223
See application file for complete search history.

(56) References Cited

U.S. PATENT DOCUMENTS

| | | | |
|---|---|---|---|
| 6,654,785 B1 | 11/2003 | Craig | |
| 6,879,838 B2* | 4/2005 | Rankin et al. | 455/456.6 |
| 7,058,392 B1* | 6/2006 | Weinman, Jr. | 455/413 |
| 7,114,126 B2 | 9/2006 | Berger | |
| 7,118,498 B2* | 10/2006 | Meadows et al. | 473/407 |
| 7,284,191 B2* | 10/2007 | Grefenstette et al. | 715/230 |
| 7,409,452 B2 | 8/2008 | Ragnet et al. | |
| 7,433,712 B2* | 10/2008 | Moran et al. | 455/557 |
| 7,440,746 B1 | 10/2008 | Swan | |

* cited by examiner

*Primary Examiner* — Philip B Tran
(74) *Attorney, Agent, or Firm* — Mima Abyad; W. James Brady; Frederick J. Telecky, Jr.

(57) ABSTRACT

A method, apparatus and a system for retrieving data relating to at least one of a student's homework, exam or solution to a problem from at least one calculator via a network, wherein the handheld calculator is utilized by the student. The method includes presenting an invitation from at least one of a computer or a calculator of an instructor on the calculator of the student for requesting the data from the calculator of the student, wherein the invitation identifies a location on a computer or a calculator for transmitting the data, attaching the data to at least a portion of the invitation, wherein the data includes identification identifying at least one of the calculator of the student or the student, and transmitting the data from the calculator to the location identified in the invitation.

22 Claims, 2 Drawing Sheets

INVITATION FOR TRANSFERRING OBJECTS IN A COMMUNICATIONS NETWORK

CROSS-REFERENCE TO RELATED APPLICATIONS

This application claims benefit of U.S. patent application Ser. No. 11/095,284, filed Mar. 30, 2005, now abandoned, which is herein incorporated by reference.

TECHNICAL FIELD

This application is a continuation of application Ser. No. 11/095,284, filed Mar. 30, 2005, the entirety of which is incorporated herein by reference. The present invention relates generally to a method for digital communications, and more particularly to a method for the transferring of objects in a communications network.

BACKGROUND

Situations can arise in a communications network when it is desired that objects, such as data, multimedia, and so forth, be transferred from a plurality of calculators to a single computer or calculator or from the single device to the plurality of calculators. An example of such a communications network can be seen in a classroom situation, wherein a single calculator (which can be used by an instructor) is connected to a plurality of calculators (which can be used by students). The instructor can distribute information (in the form of data, multimedia, and so on) to the students or the students can submit information to the instructor.

In a situation when the single calculator, i.e. the instructor's calculator, desires objects from the plurality of calculators, the single calculator can transmit an invitation to each of the plurality of calculators and request that the objects be provided. The invitation may include a specified name(s) that should be applied to the object(s). For example, in the instructor/student environment, the invitation may include a recommended name for the object, such as "Student_Name—Object_Name," "Homework—Friday—Week 3," or "Journal Entries—Week 4," and so forth, as well as contain instructions on how to proceed. The specification of the name for the object can help simplify the handling and organization of the object when they are received at the single calculator. In addition to being used to request the transmission of an object, the invitation can also be used to provide the object to the plurality of calculators. For example, in the instructor/student environment, the invitation can include the object necessary for an assignment or for an examination. Note that the term object may be used in both the singular and plural sense.

Another technique can involve the use of a message that is provided to each of the plurality of calculators and can contain information regarding a desired location where to store the requested object or where to obtain the object. This technique can be referred to as a 'file server' technique since a location (typically on a server of some type) is specified (by the message) for use as either a storage location or a server location for the object. The recipients of the message can then navigate to the specified location and retrieve the object or place its own object.

One disadvantage of the prior art is that when there is a response to the invitation by the plurality of calculators, a situation may be created wherein there is insufficient network bandwidth to support the transfer of the object. This can especially be a problem in wireless communications networks where network bandwidth can be limited. The insufficient network bandwidth can lead to a significantly degraded performance that can substantially delay the transfer of the object.

A second disadvantage of the prior art is that it is possible that the users assign a name to the object that is different from the recommended name. This inconsistent naming can make it difficult to organize the multiple objects received from the users.

Yet another disadvantage of the prior art is that the users can produce a wide variety of object types in response to an invitation. For example, in the instructor/student environment, one student may produce a simple text file while another may produce a complex multimedia presentation consisting of many files in response to the same assignment. This can lead to further difficulty in the organization of the multiple objects received from the users as well as increasing the potential for the instructor to misplace files.

An additional disadvantage of the prior art is that the file server solution can lead to difficulties for the users when they need to navigate through potentially complex file structures to locate the object that they are to retrieve or to find locations where they are to place the object. This can lead to the object being placed in incorrect locations and/or the inability to locate the object.

SUMMARY OF THE INVENTION

Embodiment of the present invention relate to a method, apparatus and a system for retrieving data relating to at least one of a student's homework, exam or solution to a problem from at least one calculator via a network, wherein the handheld calculator is utilized by the student. The method includes presenting an invitation from at least one of a computer or a calculator of an instructor on the calculator of the student for requesting the data from the calculator of the student, wherein the invitation identifies a location on a computer or a calculator for transmitting the data, attaching the data to at least a portion of the invitation, wherein the data includes identification identifying at least one of the calculator of the student or the student, and transmitting the data from the calculator to the location identified in the invitation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a communications network for use in an instructional setting with a host calculator or computer, used by an instructor, and a plurality of other calculators coupled to the host device, wherein the other calculators are used by the students. The invention may also be applied, however, to other communications networks wherein a single calculator wishes to transfer objects to multiple other calculators or receive objects from multiple other calculators.

Figure 1:
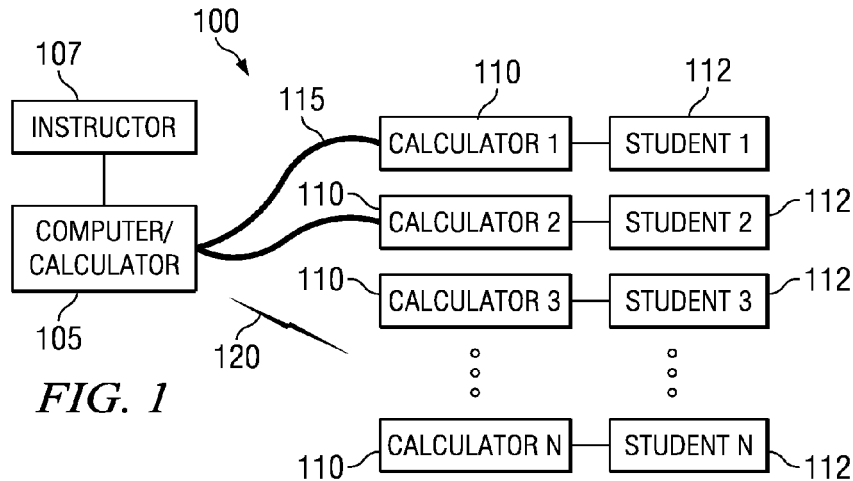
FIG. 1 is a diagram of an exemplary communications network.

With reference now to FIG. 1, there is shown a diagram illustrating an exemplary communications network 100. The communications network 100, as shown in FIG. 1, illustrates an instructional setting wherein a computer/calculator 105 being used by an instructor 107 can be coupled to one or more computers 110. The calculators 110 can be used by students 112 on an individual basis or in a group sharing fashion. The coupling between the computer/calculator 105 and the calculators 110 can be either with a wired connection 115 or a wireless connection 120 or a combination of both. As shown in FIG. 1, the communications network 100 can feature a combination of wired and wireless connections. Note that while the diagram in FIG. 1 displays a single computer 105, in practice, the communications network 100 can have multiple computers 105 that can be coupled to the calculators 110. For example, a situation may arise wherein the instructional setting may have several instructors 107, each with a separate computer 105.

One possible use of the communications network 100 can be the distribution of objects, such as data, multimedia, information, and so forth, between the computer 105 and the calculators 110. The distribution of the objects can originate at the computer 105 or terminate at the computer 105. For example, the students 112 can use the communications network 100 to submit work to the instructor 107 or retrieve assignments, examinations, information from the instructor 107. In general, the communications network 100 can be used to exchange information between a single calculator and multiple calculators.

Figure 2:
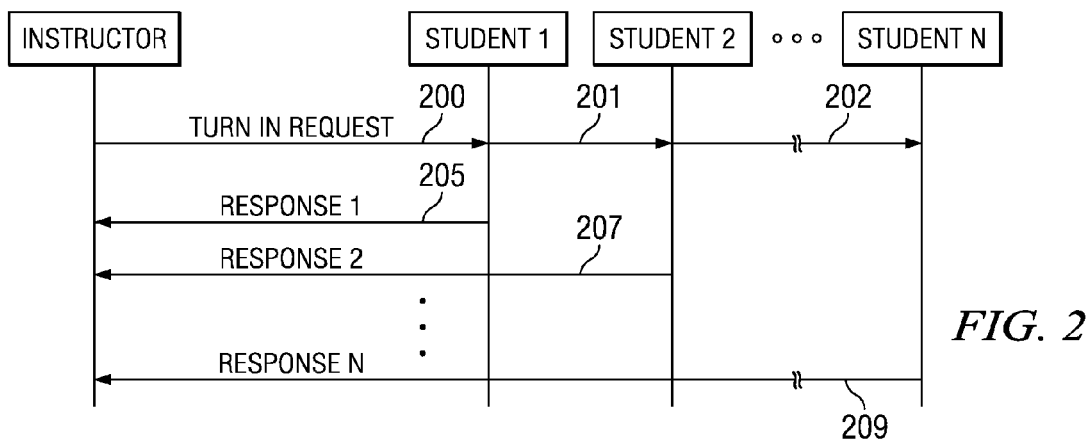
FIG. 2 is a diagram of interactions between an instructor and students, when the instructor requests the submission of work created by the students.

With reference now to FIG. 2, there is shown a diagram illustrating an exemplary interaction between instructor and students (and their electronic calculators) when the instructor requests that the students submit work. As shown in the diagram in FIG. 2, actions made by the instructor 107 and the students 112 are displayed along a vertical axis with time increasing in a descending direction. The instructor 107 can initiate the submission of the work from the students 112 by transmitting a "turn in" request (shown in FIG. 2 as line 200) from a computer, such as the computer 105, to the students 112 via calculators 110. The "turn in" request 200 is provided to each of the students 112, shown in FIG. 2 as lines 201 and 202. The "turn in" request 200 may simply be broadcast to each one of the calculators 110 from the computer 105. Alternatively, the "turn in" request 200 may be directed at a subset of students 112.

The "turn in" request 200 may specify what the instructor 107 wishes the students 112 to turn in (an object, such as files, documents, and so forth) and where to turn in the object. As each of the students 112 receives the "turn in" request 200, the students can select the object to turn in and submit the object. The transfers of the object resulting from the students 112 turning in the requested work is shown in FIG. 2 as lines 205, 207, and 209. Note that it may be possible that the student may submit more than one object in response to the "turn in" request. In such a situation, the term object can be used to also refer to the multiple objects.

Several problems may arise from this type of interaction. For example, a student may have incorrectly named the object that is being submitted. This misnamed object can provide difficulties for the instructor 107 when it comes time for the instructor 107 to evaluate the work of the student. The difficulties may include not being able to locate the object since it is named incorrectly, not being able to associate the object with the student who submitted the work, and so forth. Another problem that may arise is that it can be difficult for the instructor 107 to associate an object with a student if each of the students 112 submits objects with the same name. Furthermore, students may create different numbers and types of objects in response to a particular assignment. For example, in response to an assignment, one student may produce a simple text file, while another may produce a complex multimedia document with a multitude of files and documents.

Yet another problem may arise if the students 112 should attempt to submit their work at substantially the same time. If the students 112 attempt to submit their work at the same time, it may be possible for the communications network 100 to become saturated and the performance (data transfer rate) of the communications network 100 could drop to a very low level. This could greatly increase the amount of time required to successfully transfer the students' work.

A different "turn in" request (also referred to as an invitation) can be devised to help alleviate the problems discussed above. It can be possible to assign a unique identifier to each student's object so that the instructor 107 can readily identify the work. Additionally, when a student submits multiple objects, the multiple objects can be physically or logically grouped into a single object to help reduce problems such as misplacing objects or losing some of the objects. Furthermore, the submissions of the students' work can be scheduled to help reduce contention for network resources and therefore, improving network performance.

Figure 3A:
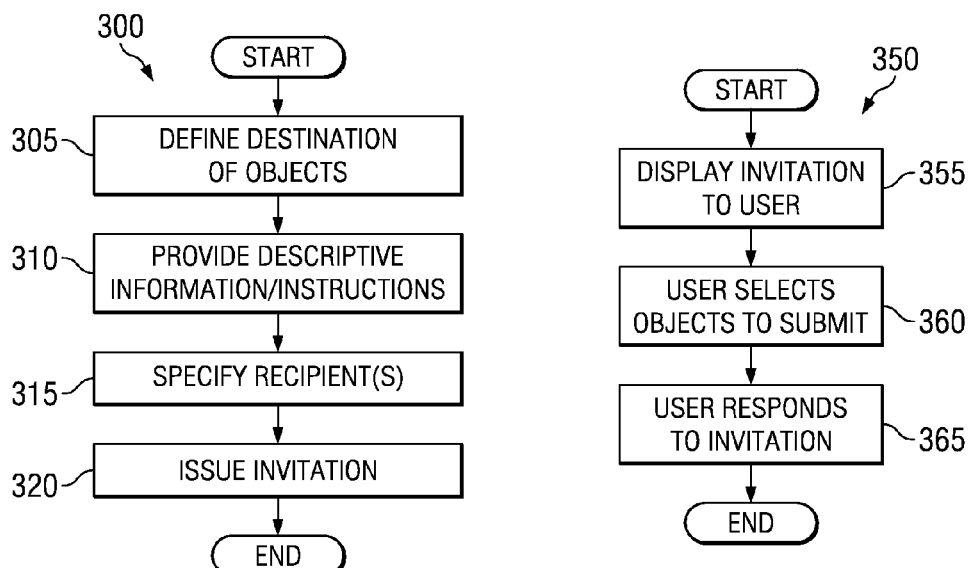
FIGS. 3a and 3b are diagrams of the creation of an invitation to request the submission of objects and the operation of a receiver of the invitation, according to a preferred embodiment of the present invention.
Figure 3B:
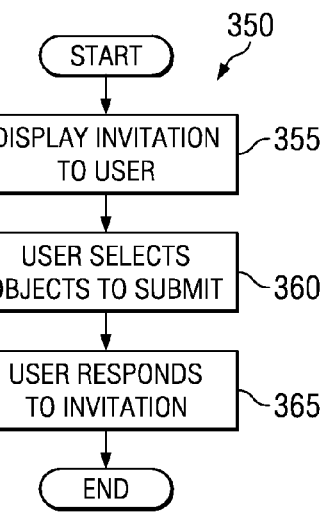

With reference now to FIGS. 3a and 3b, there are shown flow diagrams illustrating the creation of an invitation to request the submission of an object and the operation of a receiver of the invitation, according to a preferred embodiment of the present invention. The diagram shown in FIG. 3a illustrates an exemplary sequence of events 300 in the creation of an invitation to request the submission of an object by a recipient of the invitation. The sequence of events 300 can begin with the specification of a desired location for storing the object (block 305). The desired location may be a directory on a storage device, for example. The creator of the invitation can specify the desired location by browsing a file structure tree and then selecting the desired location from the file structure tree (or something similar), for example. According to a preferred embodiment of the present invention, the desired location can be specified by a user that is transmitting the invitation and can be set so that the recipient of the invitation can or cannot change the desired location. If the desired location is set so that it cannot be changed, then the object submitted by the recipient can be ensured of being placed in the desired location, simplifying the location of the object at a later time. After specifying the storage location of the object (block 305), the user can add descriptive information and/or instructions (block 310). The descriptive information and/or instructions can be used by the user to provide any necessary information to the recipient of the invitation on how to respond to the invitation, remind the recipient about submitting the object, and so forth.

After the user completes the addition of the descriptive information and/or instructions (block 310), the user can specify the recipient(s) of the invitation (block 315) and then issue the invitation (block 320). The specification of the recipient(s) does not necessarily need to occur immediately prior to the issuance of the invitation. The creator of the invitation may specify the recipient(s) of the invitation at any time prior to the issuance of the invitation in block 320. The issuance of the invitation can result in the transmission of the invitation to the recipient(s) of the invitation. According to a preferred embodiment of the present invention, the invitations can be transmitted immediately or they may be scheduled for subsequent transmission. One reason to schedule the transmission of the invitation can be to potentially reduce network resource contention by transmitting some fraction of the total number of invitations at any given time. Another reason to schedule the transmission could be to permit the user to schedule the invitation at a time advance of when the user desires the invitations to be transmitted and not have to create the invitations at the desired transmission time.

After the invitation is issued, the invitation is provided to each of the recipients. After a recipient responds to the invitation, the object is transferred from the recipient to the desired location for storing the object. If there is more than one recipient, then the object from each recipient can be assigned a unique identifier to help prevent identification problems. When a recipient has more than one object to submit, the objects can be grouped into a single unit to simplify transfer and help to prevent confusion, the combination of the multiple objects into a single unit is discussed below.

The diagram shown in FIG. 3*b* illustrates an exemplary sequence of events 350 that can occur at a recipient of an invitation that requests the submission of an object. The sequence of events 350 can begin after the recipient of the invitation actually receives the invitation. Depending upon the type of communications network, the invitation may be received at the recipient over a wired or wireless communications link. After receiving the invitation, the invitation can be displayed to the user (block 355). The invitation can be displayed on a display of a calculator that the user is operating, for example. The display of the invitation can include audio and video cues to help the user take notice of the arrival of the invitation. After reading the invitation (the content of which was supplied by the creator of the invitation, such as shown in block 310 of FIG. 3*a*), the user can select the object to submit to the creator of the invitation (block 360).

According to a preferred embodiment of the present invention, the user can select the object that he/she desires to submit and if the user selects multiple objects, they can either be physically or logically combined into a single unit. The user can select the object to be submitted by browsing a file structure tree and then selecting the object, for example. Alternatively, if the user knows the specific location of the object, he/she can enter it directly. The combination of multiple objects into a single unit can simply the transmittal and processing of the objects when submissions from multiple sources are expected. The invitation may contain a script or an application to actually perform the combination of multiple objects into a single unit. Alternatively, the invitation may be permitted to make use of applications, such as a file archive utility, installed in the calculator of the user to perform the combination operation. In addition to combining objects into a single unit, the invitation can also be able to specify a unique name (or identifier) for the object to enable easy identification of the object after it has been transmitted. According to a preferred embodiment of the present invention, the invitation may be able to suggest a default name for the object being submitted by the user. However, depending upon implementation and/or permissions set by the creator of the invitation, the user may or may not be able to change the default name. Regardless, the invitation can attach a unique identifier to the submitted object.

After selecting the object that he/she wishes to submit (block 360), the user can respond to the invitation (block 365). Responding to the invitation can result in the actual submission of the selected object and can involve the assignment of the unique identifier to the object, the combination of multiple objects into a single unit, and the transmission of the object. In addition to being able to suggest a name for the object, the invitation may also specify a destination for the object. Again, the user may or may not be able to change the destination of the object, depending upon implementation and/or permissions set by the creator of the invitation.

According to yet another preferred embodiment of the present invention, rather than transferring the object selected by the recipient, a metatag (or a group of metatags if more than one objects are selected for transfer) can be transferred in its place. When received, the metatag can provide an address to access the object so that the actual object can be retrieved when needed, rather than having the object immediately transferred when the recipient responds to the invitation. The use of metatags can help alleviate potential network resource contention issues as well as object storage problems at the recipient.

Depending upon implementation and/or permissions, the use of invitations to initiate submissions of an object can lead to a situation wherein the object from a plurality of recipients can all be located at a desired location as well as having unique identifiers that will make it simple to locate the submitted objects. Additionally, the submission of multiple objects from a single recipient can be readily supported by combining the multiple objects into a single unit. The use of the invitations can also permit the creator of the invitations to logically group the submitted objects into logical and physical groupings that can permit efficient organization and storage of the submitted objects. For example, in an instructor/student environment, an instructor can group submissions by students into different classes, assignments, weeks, terms, and so forth.

Figure 4A:
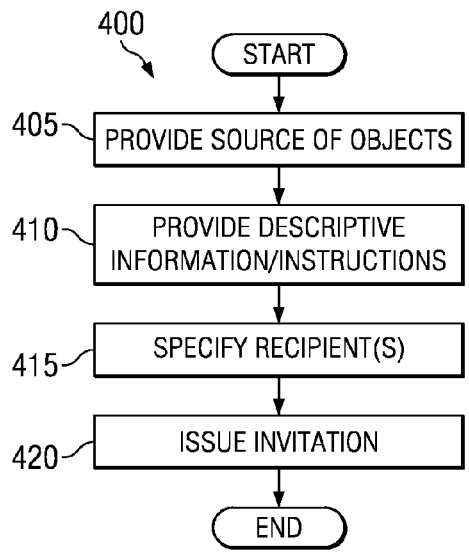
FIGS. 4a and 4b are diagrams of the creation of an invitation to request the retrieval of posted objects and the operation of a receiver of the invitation, according to a preferred embodiment of the present invention.
Figure 4B:
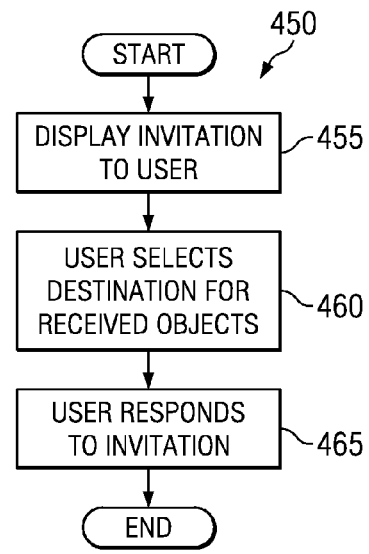

With reference now to FIGS. 4*a* and 4*b*, there are shown flow diagrams illustrating the creation of an invitation to request the retrieval of a posted object and the operation of a receiver of the invitation, according to a preferred embodiment of the present invention. The diagram shown in FIG. 4*a* illustrates an exemplary sequence of events 400 in the creation of an invitation to initiate a transfer of an object to a recipient. The sequence of events 400 can begin with the specification of the object to be transferred by providing a source of the object (block 405). As discussed previously, the creator of the invitation can browse a file structure tree to specify the object to be transferred. According to a preferred embodiment of the present invention, if multiple objects are to be transferred, the objects may or may not be logically or physically grouped into a single unit prior to transfer and the creator of the invitation may specify a single unit or the individual objects to be transferred.

After providing the source of the object, the creator of the invitation can provide descriptive information or instructions regarding the object (block 410). For example, the creator can provide a description of the object that will be transferred if the recipient responds to the invitation, instructions on what the recipient can or is expected to do with the object once the objects have been transferred, and so on. The creator of the invitation can then specify the recipient(s) of the invitation (block 415) and then issue the invitation (block 420), which will result in the transmission of the invitation to one or more recipients. As discussed above, the specification of the recipient(s) does not necessarily need to occur immediately prior to the issuance of the invitation. The creator of the invitation may specify the recipient(s) of the invitation at any time prior to the issuance of the invitation in block 420.

The diagram shown in FIG. 4b illustrates an exemplary sequence of events 450 that can occur at a recipient of an invitation that requests a transfer of an object. The sequence of events 450 can begin after the recipient of the invitation actually receives the invitation. After receiving the invitation, the invitation can be displayed to the user (block 455). After reading the invitation, the user can select a destination where the transferred object will be stored (block 460). Then, the user can respond to the invitation (block 465). Responding to the invitation can result in the immediate transfer of the object to the user or may result in the scheduling of a subsequent transfer of the object to the user, depending upon the implementation of the invitation.

As discussed above, the immediate acceptance of an invitation by a large number of recipients can result in an oversaturated communications network that can lead to poor network performance. Therefore, there may be a desire to help reduce the contention for network resources. One possible technique that can help reduce contention for network resources is to spread out the demand for the network resources over time so that there is not a large number of users receiving invitations and then demanding network resources at any given time.

Figure 5:
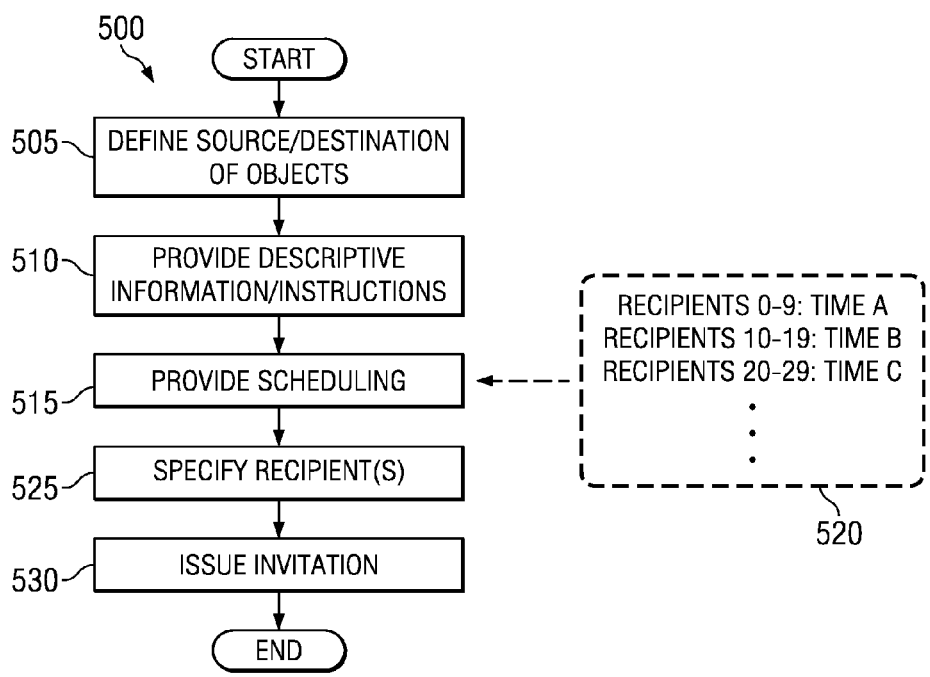
FIG. 5 is a diagram of the creation of an invitation, wherein scheduling is used to reduce network contention, according to a preferred embodiment of the present invention.

With reference now to FIG. 5, there is shown a flow diagram illustrating the creation of an invitation, wherein scheduling is used to reduce network contention, according to a preferred embodiment of the present invention. The diagram shown in FIG. 5 illustrates an exemplary sequence of events 500 in the creation of an invitation that can be used to either request the submission of an object or the retrieval of a posted object. The sequence of events 500 can begin with the creator of the invitation defining either a source or a destination of the object being transferred (block 505). If the invitation is to be used to request the recipient of the initiation to submit an object, then the creator can define a destination where the submitted object will be stored. If the invitation is to be used to inform the recipient to retrieve a specified object, then the creator can define a source of the object.

After the definition of the source or destination of the object (block 505), the creator of the invitation can provide descriptive information and/or instructions for the invitation (block 510). As discussed previously, the descriptive information may provide the recipient information regarding the object that they are to submit or receive, while the instructions may provide the recipient with needed help on how to respond to the invitation, for example. Once the invitation has been completely specified by the creator, scheduling information can be provided (block 515). According to a preferred embodiment of the present invention, the scheduling information can be provided by the creator of the invitation. Alternatively, the scheduling information can be generated by the calculator used by the creator to transmit the invitation. An exemplary schedule for invitation transmission times based different groups of recipients is shown in block 520.

An example of creator generated scheduling can be a list of recipients of the invitation and time when the invitation should be transmitted to each of the recipients. Another variation can be a list of recipients of the invitation and a time that corresponds to a delay that is assessed on the recipient after the recipient responds to the invitation prior to the transfer of the object. Similarly, if the scheduling information is to be generated by the calculator, then each invitation may be assigned a randomly selected transmit time, or alternatively, a randomly selected delay may be assigned to each invitation. Yet another preferred embodiment may be having a list of delays with a delay associated with each recipient and then referencing the list of delay when scheduling the transmission of the invitation or the forced delay. In addition to scheduling invitations (or delays) for each recipient, the scheduling can also occur for groups of recipients, as long as the number of recipients within a group is not so large that their resulting object transfers would negatively affect network performance.

After the scheduling has been completed (block 515), then the recipient(s) of the invitation can be specified (block 525) and then the invitations can be issued (block 530). If the scheduling affects the transmit time of the invitations, such as the exemplary scheduling shown in block 520, then an invitation will be transmitted only when its scheduled time is equal to the local time at the calculator transmitting the invitations. If the scheduling affects a delay asserted on each invitation response, then the delay may be inserted into the invitation and all invitations can be transmitted at substantially the same time.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A method of a processor for retrieving data relating to at least one of a student's homework, exam or solution to a problem from at least one handheld calculator via a network, wherein the handheld calculator is utilized by the student, the method comprising:

presenting an invitation from at least one of a computer or a calculator of an instructor on the calculator of the student for requesting the data from the calculator of the student, wherein the invitation identifies a location for retrieving the data from at least one of the computer of the instructor, the calculator of the instructor or the calculator of the student;

attaching the data to at least a portion of the invitation, wherein the data includes identification identifying at least one of the calculator of the student;

scheduling information relating to the invitation; and transmitting the data from the calculator to the location identified in the invitation.

2. The method of claim 1 further comprising retrieving the data from the calculator of the student.

3. The method of claim 1 further comprising finding the location of the data on the calculator of the student.

4. The method of claim 1, wherein the scheduling information comprises at least one of a transmission time for the invitation or a transmission time of the data from the calculator of the student.

5. The method of claim 1, wherein the scheduling information comprises a delay that is imparted prior to the transfer of the data.

6. The method of claim 1, wherein at least one of the calculators of the students are on the same network or different networks.

7. The method of claim 6 further comprises, assigning a unique identifier that is based upon an identity of the recipient of the invitation.

8. The method of claim 1, wherein the data comprises at least one document when there is more than one document, the documents are grouped into a single unit prior to transfer.

9. The method of claim 1, wherein the invitation further comprises at least one of instructions for responding to the invitation, applet or a browser.

10. The method of claim 1, wherein the network is a wireless network.

11. An apparatus for performing a method of retrieving data relating to at least one of a student's homework, exam or solution to a problem from at least one handheld calculator via a network, wherein the handheld calculator is utilized by the student, the method comprising:
  presenting an invitation from at least one of a computer or a calculator of an instructor on the calculator of the student for requesting the data from the calculator of the student, wherein the invitation identifies a location or retrieving the data from at least one of the computer of the instructor, the calculator of the instructor or the calculator of the student;
  attaching the data to at least a portion of the invitation, wherein the data includes identification identifying at least one of the calculator of the student;
  scheduling information relating to the invitation; and
  transmitting the data from the calculator to the location identified in the invitation.

12. The apparatus of claim 11 further comprising retrieving the data from the calculator of the student.

13. The apparatus of claim 11 further comprising finding the location of the data on the calculator of the student.

14. The apparatus of claim 11, wherein scheduling information comprises at least one of a transmission time for the invitation or a transmission time of the data from the calculator of the student.

15. The apparatus of claim 11, wherein scheduling information comprises a delay that is imparted prior to the transfer of the data.

16. The apparatus of claim 11, wherein at least one of the calculators of the students are on the same network or different networks.

17. The apparatus of claim 16 further comprises assigning a unique identifier that is based upon an identity of the recipient of the invitation.

18. The apparatus of claim 11, wherein the data comprises at least one document when there is more than one document, the documents are grouped into a single unit prior to transfer.

19. The apparatus of claim 11, wherein the invitation further comprises at least one of instructions for responding to the invitation, applet or a browser.

20. The apparatus of claim 11, wherein the network is a wireless network.

21. A classroom system, comprising:
  at least one calculator of an instructor, wherein the instructor utilizes the instructor calculator for presenting an invitation from the at least one calculator of the instructor to at least one calculator of a student, the invitation requests data from the at least one calculator of the student;
  at least one calculator network for allowing the invitation and the data to transmit between the at least one calculator of the instructor and the at least one calculator of the student; and
  wherein the calculator of the student attaches the data to at least a portion of the invitation, wherein the data includes identification identifying at least one of the calculator of the student, scheduling information relating to the invitation wherein said scheduling at least one of reduces contention for at least one resource and improves a network performance, and transmitting the data.

22. The classroom system of claim 21, wherein the invitation identifies a location for retrieving the data.

* * * * *